United States Patent [19]
Suda et al.

[11] Patent Number: 5,970,258
[45] Date of Patent: *Oct. 19, 1999

[54] OPTICAL APPARATUS CAPABLE OF PERFORMING A DESIRED FUNCTION BY GAZING

[75] Inventors: Yasuo Suda, Yokohama; Katsunori Nakamura, Kawasaki, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/819,134

[22] Filed: Mar. 17, 1997

Related U.S. Application Data

[63] Continuation of application No. 08/473,991, Jun. 7, 1995, abandoned, which is a continuation of application No. 08/102,999, Jul. 28, 1993, abandoned.

[30] Foreign Application Priority Data

Jul. 31, 1992 [JP] Japan ..................... 4-205419
Sep. 18, 1992 [JP] Japan ..................... 4-249802

[51] Int. Cl.$^6$ .................................................. G03B 17/00
[52] U.S. Cl. ............................................................. 396/51
[58] Field of Search ................................ 396/51; 364/550, 364/518

[56] References Cited

U.S. PATENT DOCUMENTS

| | | | |
|---|---|---|---|
| 4,109,145 | 8/1978 | Graf | 250/201 |
| 4,595,990 | 6/1986 | Garwin et al. | 364/518 |
| 4,648,052 | 3/1987 | Friedman et al. | 364/550 |
| 5,053,803 | 10/1991 | Suda et al. | 354/466 |
| 5,182,443 | 1/1993 | Suda et al. | 250/201.2 |
| 5,239,337 | 8/1993 | Takagi et al. | 354/471 |
| 5,245,381 | 9/1993 | Takagi et al. | 354/471 |

FOREIGN PATENT DOCUMENTS 387818 4/1991 Japan .
3109029 5/1991 Japan .

*Primary Examiner*—Russell Adams
*Attorney, Agent, or Firm*—Fitzpatrick, Cella, Harper & Scinto

[57] ABSTRACT

The present invention provides a conveniently usable optical apparatus such as a camera which is provided with a visual axis detecting apparatus and a display portion in the field of view of a finder and which realizes a predetermined operating function which is not started when the finder observer is seeing the display portion and the like.

6 Claims, 14 Drawing Sheets

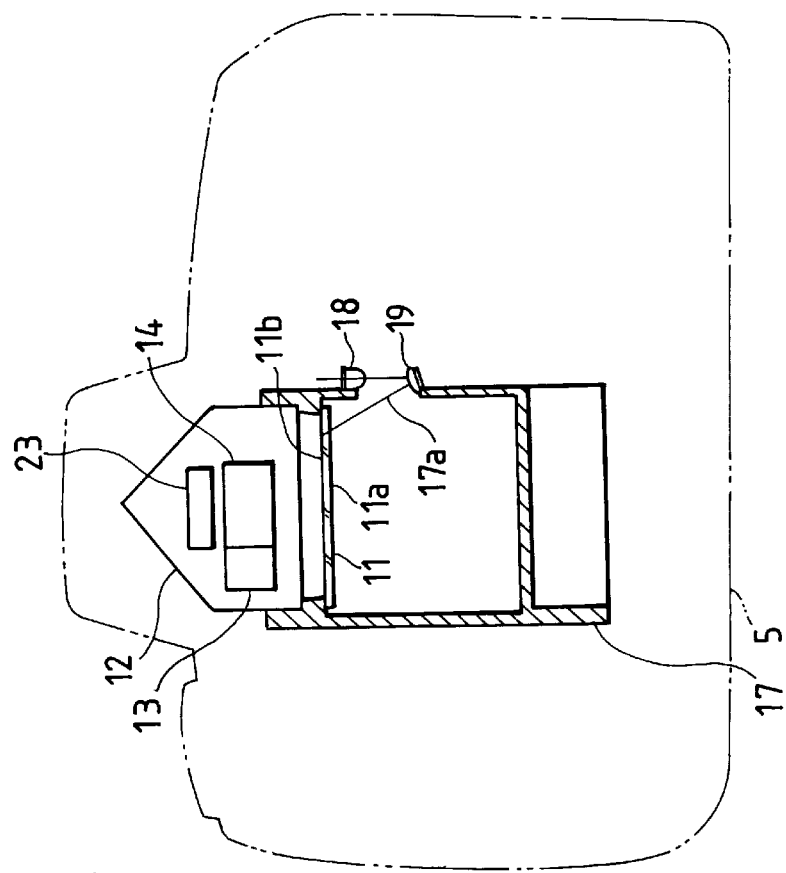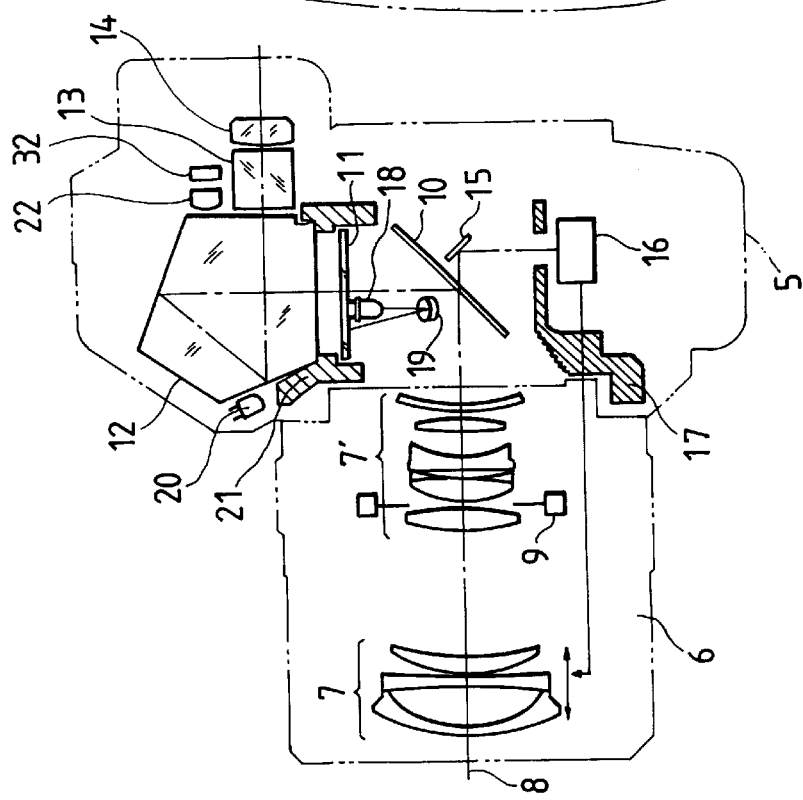

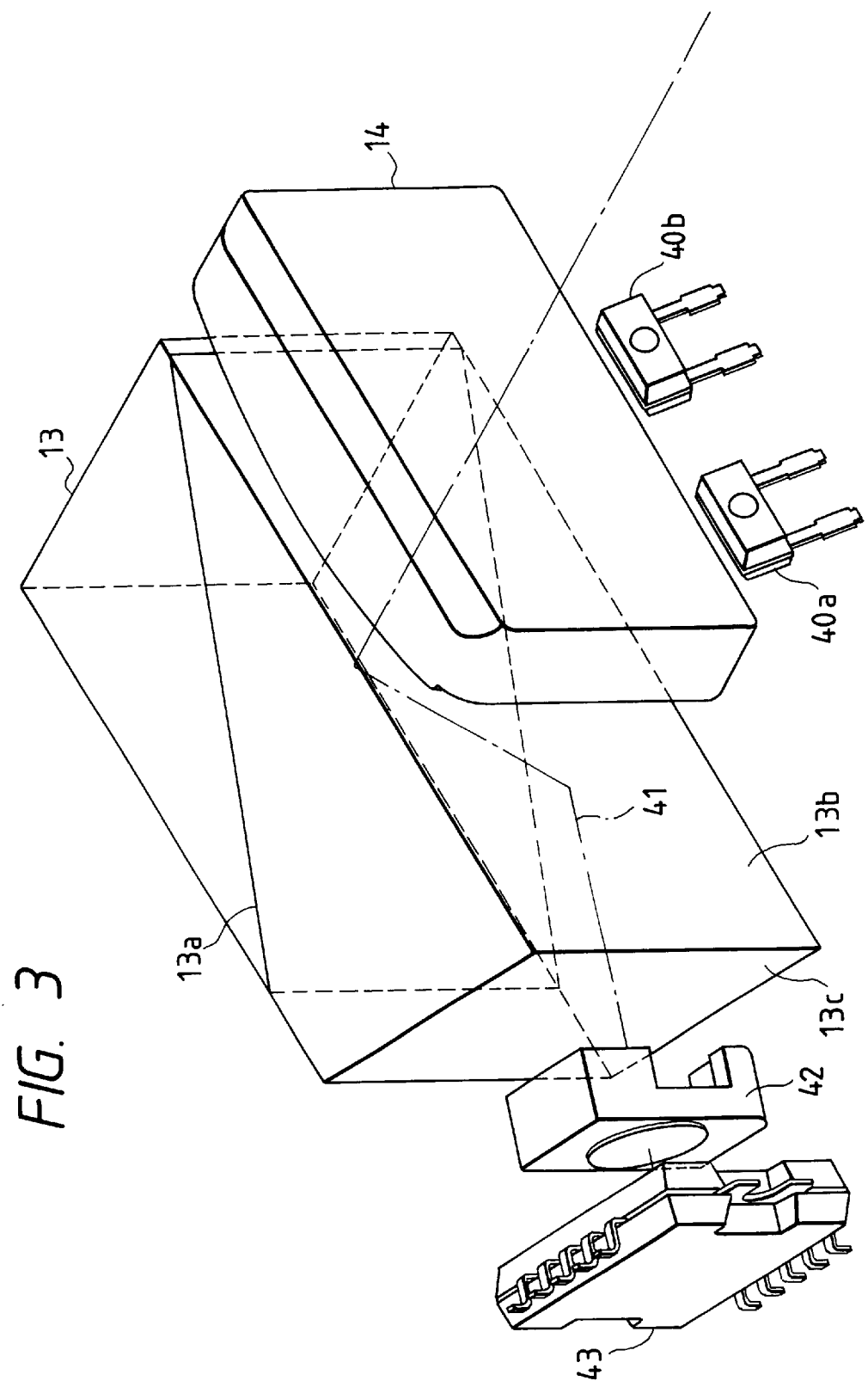

FIG. 19

| AV0 | 1.0 | 1.2 | 1.4 | 1.8 | 2.0 | 2.5 | 2.8 | 3.5 | 4.0 | 4.5 | 5.6 | FNO |
|-----|-----|-----|-----|-----|-----|-----|-----|-----|-----|-----|-----|------|
| FSC | ○ | ○ | ○ | ○ | ○ | ○ | ○ | -1/8 | -2/8 | -3/8 | -6/8 | STEP |

OPTICAL APPARATUS CAPABLE OF PERFORMING A DESIRED FUNCTION BY GAZING

This application is a continuation of application Ser. No. 08/473,991 filed Jun. 7, 1995, which is a continuation of Ser. No. 08/102,999 filed Jul. 28, 1993, both abandoned.

BACKGROUND OF THE INVENTION

1. Field of the Invention

This invention relates to an optical apparatus such as a single-lens reflex camera, a still video camera or a video camera which is provided with a visual axis detecting device and designed to start a predetermined control function on the basis of the output of the visual axis detecting device.

2. Related Background Art

As disclosed in Japanese Laid-Open Patent Application No. 3-87818, there is known an apparatus which can select a control function by an observer's visual axis position. By applying such an apparatus to a camera or the like, the setting or the like of photographing conditions can be input by the visual axis.

Also, in the visual axis detecting device described above, a photographer's eyeball is illuminated by an infrared light emitting diode or the like and the image of the eyeball is directed to an image sensor such as a CCD.

Further, it is often the case that display means in the field of view of a finder is illuminated by an LED of high luminance.

Now, generally in the field of view of the finder of a camera, a display portion for displaying photographing information is provided adjacent to an object image observation field, and in case of photographing, attention is always paid to this display portion and an object image, whereby photographing under appropriate conditions becomes possible. Accordingly, it is necessary for the finder observer to see the display portion and the object image alternately, but this often results in the following inconvenience. Human sight is obtained as a result of collectively processing image information projected onto a retina, and image information obtained a moment before is also added and recognized there. In fact, it has been found that the gaze point repeats a considerably vehement jumping exercise and stoppage, and there is a time when the gaze position by the sight and eyeball motion cannot be completely related with each other at one to one.

Accordingly, in spite of the observer being conscious of seeing the display portion, it is detected that actually, the visual axis position lies on an index mark for a predetermined control function started on the basis of the output of the visual axis detecting device, and it may happen that against the observer's will, the camera starts this predetermined function.

Also, U.S. Pat. No. 4,109,145 is known as an eye-controlled apparatus.

SUMMARY OF THE INVENTION

In view of the above-noted disadvantage, the present invention has as an object thereof to realize, in an optical apparatus such as a camera provided with a visual axis detecting device and a display portion in the field of view of a finder, a predetermined operating function which is not started when the finder observer is seeing the display portion and which is reliably started when the finder observer looks at a visual axis input index mark or in the vicinity thereof.

It is also an object of the present invention to provide a readily usable optical apparatus in which detecting and judging means discriminate by visual axis detecting means that the photographer is seeing in the display portion in the field of view of the finder or a visual axis input index mark and the photographer can easily and reliably cause a function corresponding to the display portion or the index mark to be executed.

On the other hand, the visual axis detecting device illuminates the photographer's eyeball by an infrared light emitting diode or the like and therefore, when the photographer is looking into the field of view of the finder all the while, it is possible that depending on the photographer, fatigue or the like of the eye may be caused by the infrared light.

Also, the image of the photographer's eyeball illuminated by the infrared light emitting diode or the like is detected by an image sensor such as a CCD and therefore, to drive the image sensor such as a CCD when visual axis detection is effected, a high voltage and high current source becomes necessary, and when as previously described, the photographer continues to look into the field of view of the finder, the consumption of battery capacity becomes great in an optical apparatus such as a camera, and the number of rolls of film usable for photographing may be reduced.

It is another object of the present invention to provide an optical apparatus which is provided with a display portion disposed in the field of view of a finder and designed to make the control function of the optical apparatus performed or a display portion corresponding to a visual axis input index mark, whereby visual axis detecting means judges which of the display portions is selected, and which has display means designed to enable the photographer to confirm easily.

It is still another object of the present invention to provide a camera which is provided with finder means for observing an object therethrough, visual axis detecting means for detecting the visual axis position of the observer observing said finder mean, means for determining a distance measuring field on the basis of the output of said visual axis detecting means and forming a focus adjustment signal with respect to said distance measuring field, and a display portion for displaying the control function or the like of the camera in the field of view of said finder means, and in which said finder means has a visual axis input index mark in a scene observation field, said visual axis detecting means forming a signal for causing a desired function to operate when it detects that the observer's visual axis lies on or a near said visual axis input index mark, said display portion set along a side of the field of view of the finder and further, and said visual axis input index mark spaced apart from the display portion to such a degree that a mistake of detection does not occur.

It is yet another object of the present invention to provide an optical apparatus which has display portions corresponding to a plurality of distance measuring points in the field of view of a finder, and which has means for determining one of said distance measuring points by the operator's visual axis and effecting focus adjustment in conformity with said determined distance measuring point and means for the optical apparatus itself to determine one of said distance measuring points in conformity with an object image and effect focus adjustment at said determined distance measuring point, and which is provided with an algorithm for effecting the detection of the observer's visual axis on a visual axis input index mark after in-focus is judged by one of said focus adjusting means.

Particularly, it is an object of the present invention to provide an optical apparatus in which when in-focus is judged by one of said focus adjusting means, the detection of the observer's visual axis on the visual axis input index mark is effected after the focusing position and photometry value of a lens are fixed.

It is also an object of the present invention to provide an optical apparatus having means for causing a desired function to operate in the detection of said visual axis, thereby prohibiting said visual axis detecting operation during the photographing mode of the optical apparatus which seems to be unsuitable in photographing.

It is a further object of the present invention to provide an optical apparatus which is provided with visual axis detection stopping means for stopping the detection of said visual axis when in the detection of said visual axis, the detection of the visual axis cannot be accomplished within a predetermined number of times or a predetermined time and after the detection of said visual axis becomes possible and a desired function is caused to operate, whereby a reduction in battery capacity is prevented and also eye fatigue is at least reduced.

It is still a further object of the present invention to provide an optical apparatus in which visual axis detecting means for detecting the visual axis position of the observer observing the interior of the field of view of a finder has detecting and judging means, and the detecting and judging means of a display portion for displaying a control function or the like corresponding to a distance measuring field in the field of view of the finder and the detecting and judging means of a visual axis input index mark position are made different from each other, whereby responsiveness or reliability matching a preset desired function is improved.

It is yet still a further object of the present invention to provide an optical apparatus which has display means corresponding to a distance measuring field in the field of view of a finder, and display means for a visual axis input index mark and further has multi-division photometry means for dividing the effective area in the field of view of the finder into a plurality of areas and photometering the luminance of said plurality of divided areas, and in which when one of said distance measuring field and said visual axis input index mark is selected by visual axis detecting means, said display means displays that effect on the basis of the value of a photometering area corresponding to the location of display in the field of view of the finder.

BRIEF DESCRIPTION OF THE DRAWINGS

FIG. 2A is a cross-sectional view of a single-lens reflex camera as it is seen sideways thereof.

FIG. 2B is a cross-sectional view of the camera as it is seen from the rear thereof.

FIG. 3 is a perspective view showing the constituents of a visual axis detecting apparatus.

FIG. 19 is a diagram corresponding to the correction of the diffusion characteristic of the screen.

DETAILED DESCRIPTION OF THE PREFERRED EMBODIMENTS

Figure 1:
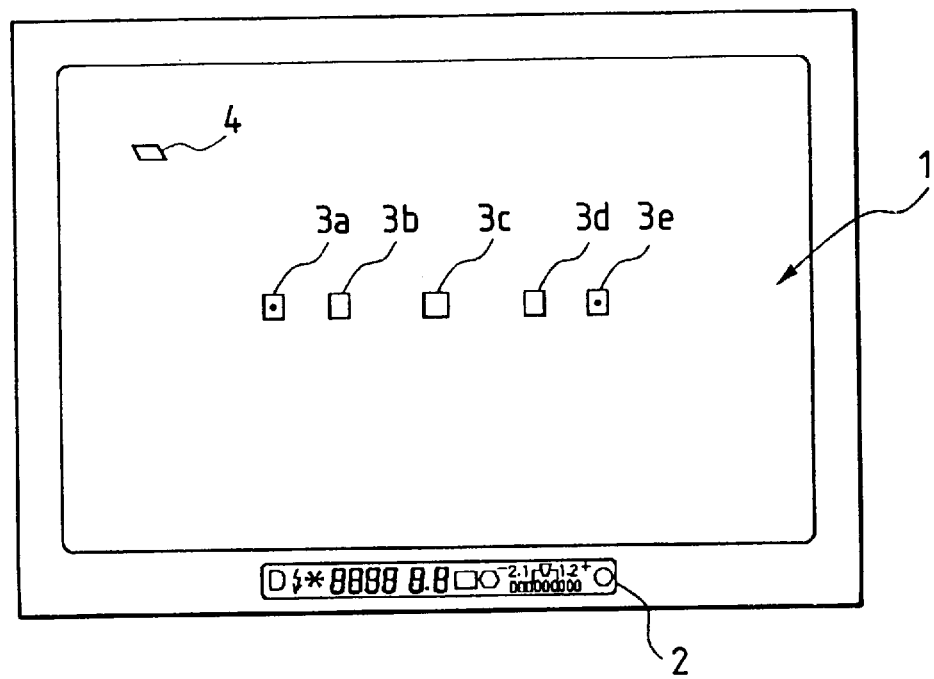
FIG. 1 illustrates the field of view of a finder.

FIGS. 1 to 11 show an embodiment in which the present invention is applied to a camera.

FIGS. 2A and 2B show a camera according to the present invention, particularly a single-lens reflex camera, FIG. 2A being a cross-sectional view of the camera as it is seen sideways thereof, and FIG. 2B being a cross-sectional view of the camera as it is seen from the rear thereof. In these figures, the reference numeral 5 designates a single-lens reflex camera body, and the reference numeral 6 denotes a lens barrel holding a portion 7 of a photo-taking lens for focus adjustment and portions 7 and 7' of the photo-taking lens for magnification change, on the basis of a command from the single-lens reflex camera body 5, for movement in the direction of an optical axis 8. The lens barrel 6 is removably mountable on the camera body. The reference numeral 9 designates a stop device for limiting a phototaking light beam, and so-called F number is prescribed by this stop device.

The reference numeral 10 denotes a quick return half mirror, the reference numeral 11 designates a focusing screen having a Fresnel lens 11a on the light incidence surface thereof and a mat surface 1ib on the light emergence surface thereof, the reference numeral 12 denotes a pentagonal prism, the reference numeral 13 designates a beam splitter for separating infrared light for visual axis detection, and the reference numeral 14 denotes an eyepiece. These together constitute a finder system.

The reference numeral 16 designates a conventional focus detecting device having a plurality of distance measuring fields which, with a lens driving device, not shown, constitutes an automatic focus adjusting apparatus. The object light transmitted through the half mirror 10 is directed via a sub-mirror 15 disposed behind it.

The reference numeral 17 denotes a front plate holding these finder constituents and the focus detecting device and constituting a mirror box. As shown in FIG. 2B, a light emitting diode (hereinafter referred to as LED) 18 is mounted on a side of the front plate 17 with the light emission direction thereof turned downwardly. The light of this LED is visible light, and enters a mirror lens 19 made of transparent resin which is also mounted on the side of the mirror box. The upper surface 19a of the mirror lens 19 is a convex surface and the lower surface 19b thereof is a flat surface, which is a reflecting surface coated with aluminum.

By the reflecting surface being formed within the transparent resin as described above, the environment resistance of the reflecting surface formed of aluminum can be enhanced. The light beam reflected by the reflecting surface is directed to the focusing screen 11 and causes a visual axis input index mark which will be described later to be superimpose-displayed.

The reference numeral 20 designates a superimpose LED of high luminance similar to the LED 18 which can be visually recognized even in a bright object. Light emitted from this LED 20 passes through a prism 21 for light projection, is reflected by the quick return half mirror 10 and causes a distance measuring field frame on the focusing screen 11 which corresponds to the distance measuring field of the focus detecting device to be superimpose-displayed.

Distance measuring frames on the focusing screen 11 are formed at a plurality of locations correspondingly to focus detection areas, and they are illuminated by the corresponding five superimpose LEDs 20 (the distance measuring frames 3a, 3b, 3c, 3d and 3e are illuminated by LED-L1, LED-L2, LED-C, LED-R1 and LED-R2, respectively.

The reference numerals 22 and 32 denote an imaging lens and a photometry sensor, respectively, for measuring the object luminance in an observation image field.

A visual axis detecting apparatus will now be described. FIG. 3 is a perspective view showing the constituents of the visual axis detecting apparatus. In FIG. 3, the reference numerals 13 and 14 designate the beam splitter and the eyepiece, respectively, shown in FIG. 2, and the dichroic mirror 13a of the beam splitter 13 reflects infrared light used for visual axis detection and forms an optical path for visual axis detection. The reference characters 40a and 40b denote infrared light emitting diodes (hereinafter referred to as IREDs) which emit infrared light toward the finder observer's eyeball. The light beam reflected by the cornea of the eyeball is transmitted through the eyepiece 14 and enters the entrance surface 13b of the beam splitter 13. Within the beam splitter 13, the light is first reflected by the dichroic mirror 13a, and then totally reflected by the entrance surface 13b, whereafter it emerges from an exit surface 13c. An imaging lens 42 is disposed in opposed relationship with the exit surface 13c, and forms the images of the finder observer's eyeball and the light emitting portions of IREDs 40a and 40b on the light receiving portion of an area sensor 43.

As regards a process for finding the visual axis position from the output of the area sensor 43, use can be made of the technique disclosed in Japanese Laid-Open Patent Application No. 3-109029, and this process need not be described herein.

Figure 4:
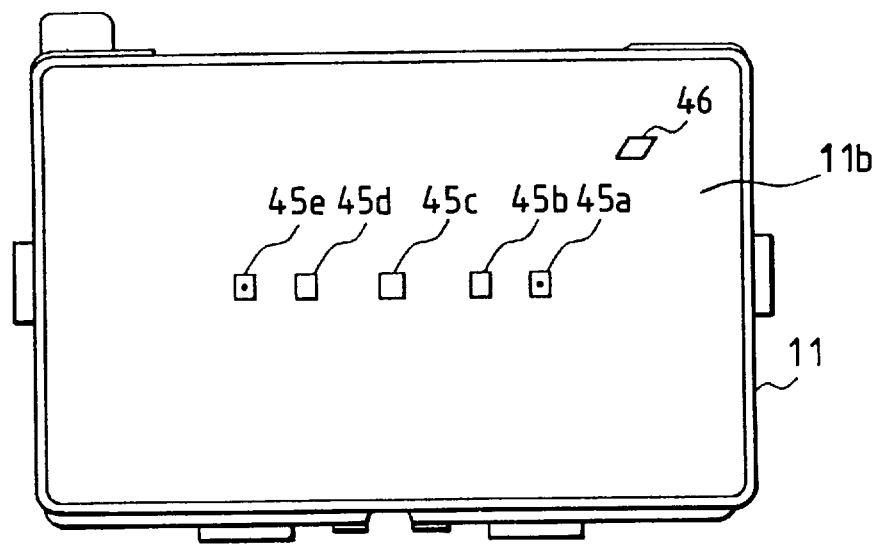
FIG. 4 is a plan view of a focusing screen.

Reference is now had to FIGS. 4 and 1 to describe the field of view of the finder of the camera. FIG. 4 is a plan view particularly showing the focusing screen 11 shown in FIGS. 2A and 2B. The reference characters 45a–45e denote five distance measuring field frames corresponding to the distance measuring fields of the focus detecting device and arranged laterally at the center of the image field. A parallelopiped index mark lying on the right upper portion of the focusing screen 11 is a visual axis input index mark which is for exercising the stopping-down function of stopping down the stop 9 of the photo-taking lens to an aperture used for photographing, for example, for the purpose of confirmation of the depth of the object when the aforementioned visual axis detecting apparatus detects that the observer's visual axis lies on or near this visual axis input index mark. These are all formed in a minute prism row on the mat surface 11b of the focusing screen. The visual axis input function is not limited to stopping down, but may be the releasing of the AF function or the operation of zooming daytime stroboscope, as desired.

FIG. 1 shows the field of view of the finder of the camera. In FIG. 1, the reference numeral 1 designates an object image field, and the reference numeral 2 denotes a display portion for displaying photographing conditions such as the shutter speed, the aperture value and the amount of exposure correction. The display portion 2 is, for example, the screen of a liquid crystal display device. The reference characters 3a–3e designate the distance measuring frames 45a–45e on the focusing screen as they are seen through the pentagonal prism 12 or the like. It is due to the action of the roof surface of the pentagonal prism that their arrangement is reversed at the right and left. Likewise, a parallelopiped index mark 4 on the upper left portion of the object image field 1 corresponds to the visual axis input index mark 46 on the focusing screen which is shown in FIG. 4. The actual detection area is of a dimension several times as great as the index mark so that the index mark may not be large enough to form a hindrance to the field of view.

Figure 5:
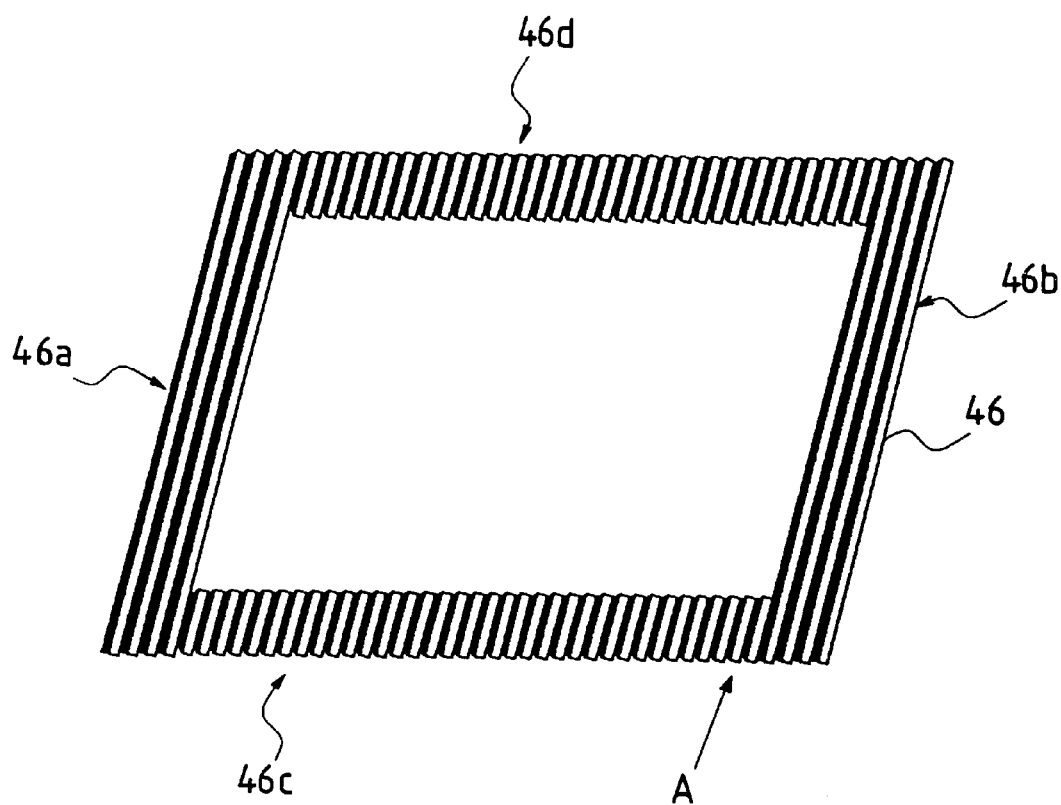
FIG. 5 is a detailed view of a visual axis input index mark.
Figure 6:
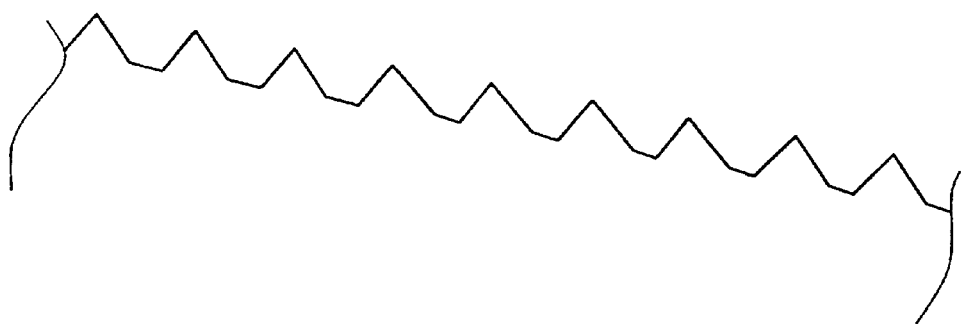
FIG. 6 is a fragmentary cross-sectional view of the visual axis input index mark.

The construction of the visual axis input index mark will now be described in detail with reference to FIGS. 5 and 6. FIG. 5 is an enlarged detailed view of the visual axis input index mark, and as shown in this figure, the visual axis input index mark comprises a number of prisms arranged along one direction. The cross-sectional shape of the visual axis input index mark is an aggregate of triangular projections each having a ridgeline, as shown in FIG. 6 which is an enlarged cross-sectional view as seen in the direction of arrow A in FIG. 5.

Accordingly, a light beam incident on the visual axis input index mark through the photo-taking lens 7 deviates from the direction toward the eyepiece 14 and therefore, this portion is dark as compared with the mat surface around it and is visually recognized as a black line. Conversely, the prisms have the action of changing the light beam incident from obliquely below the focusing screen toward the eyepiece 14 and therefore, it is possible to control the display color of the visual axis input index mark by the utilization of such a characteristic. The illumination by the LED 18 previously described is for realizing such superimposed display.

Also, this visual axis input index mark comprises segments 46a and 46b extending in the same direction as the ridgelines of the minute prisms and segments 46d and 46c intersecting them at an angle of 45° or greater and therefore, segments constituting the display are not of a staircase-like shape and can provide a display of high dignity.

Figure 7:
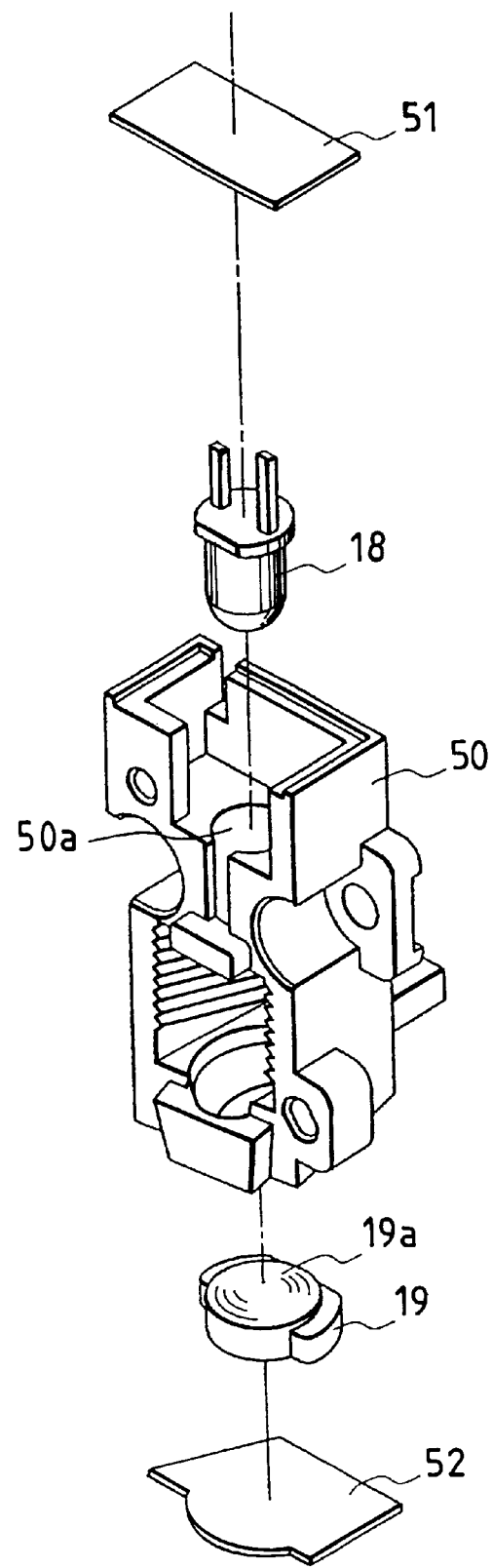
FIG. 7 is an exploded perspective view of an illuminating unit.

The illuminating system for superimpose display by the LED 18 will now be described in more detail with reference to FIGS. 7 to 9. FIG. 7 is an exploded perspective view showing the construction of an illuminating unit including the LED 18 and the mirror lens 19. In FIG. 7, the reference numeral 50 designates an LED holder having upper and lower opening portions 50a and 50b in which the LED 18 and the mirror lens 19, respectively, are positioned and held. The reference numerals 59 and 52 denote light intercepting plates for preventing the leakage of the LED light.

Figure 8:
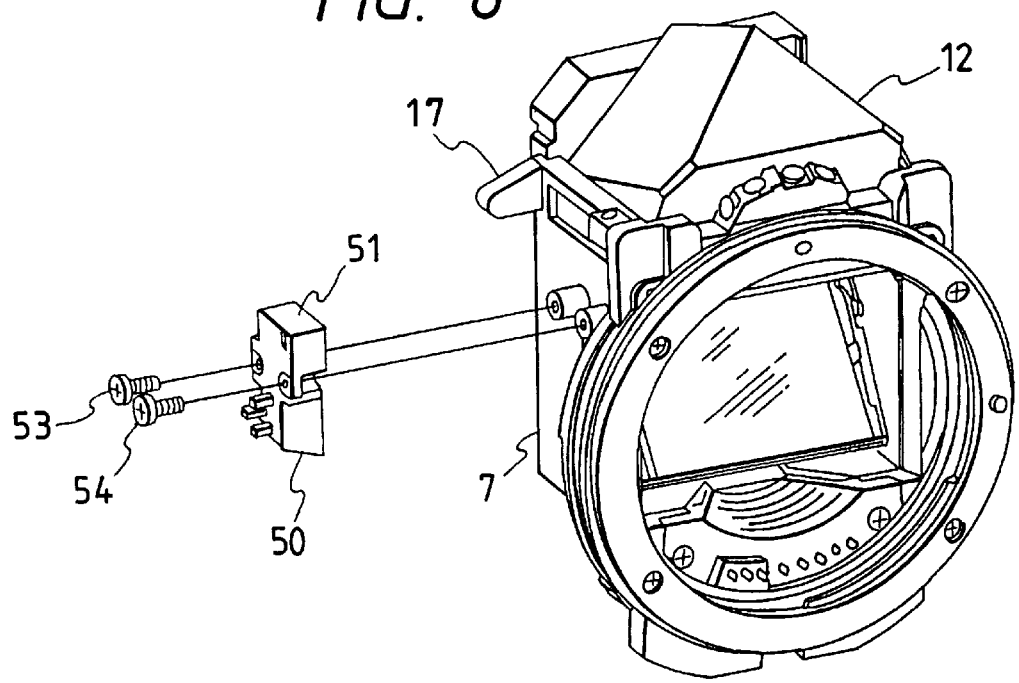
FIG. 8 is a perspective view showing the mounting of the illuminating unit onto a front plate.

This illuminating unit is in such a form as shown in FIG. 8 and is fixed to the front plate 7 by the use of screws 53 and 54. As shown in FIG. 2B, an opening 17a is formed in a side of the mirror box constituted by the front plate 17, and the LED light is applied through this opening to the visual axis input index mark 46. At this time, the positional relation between the mirror lens and the visual axis input index mark is set such that the irradiating light emerges obliquely forwardly from the mirror lens when the focusing screen is seen from above it as in FIG. 4. This is because when such a positional relation is adopted, the angle formed by and between the tangential line of the Fresnel lens at the position of the visual axis input index mark and the irradiating light becomes small and ghost light caused by the scattering on the ridgeline of the Fresnel lens can be obviated.

Figure 9:
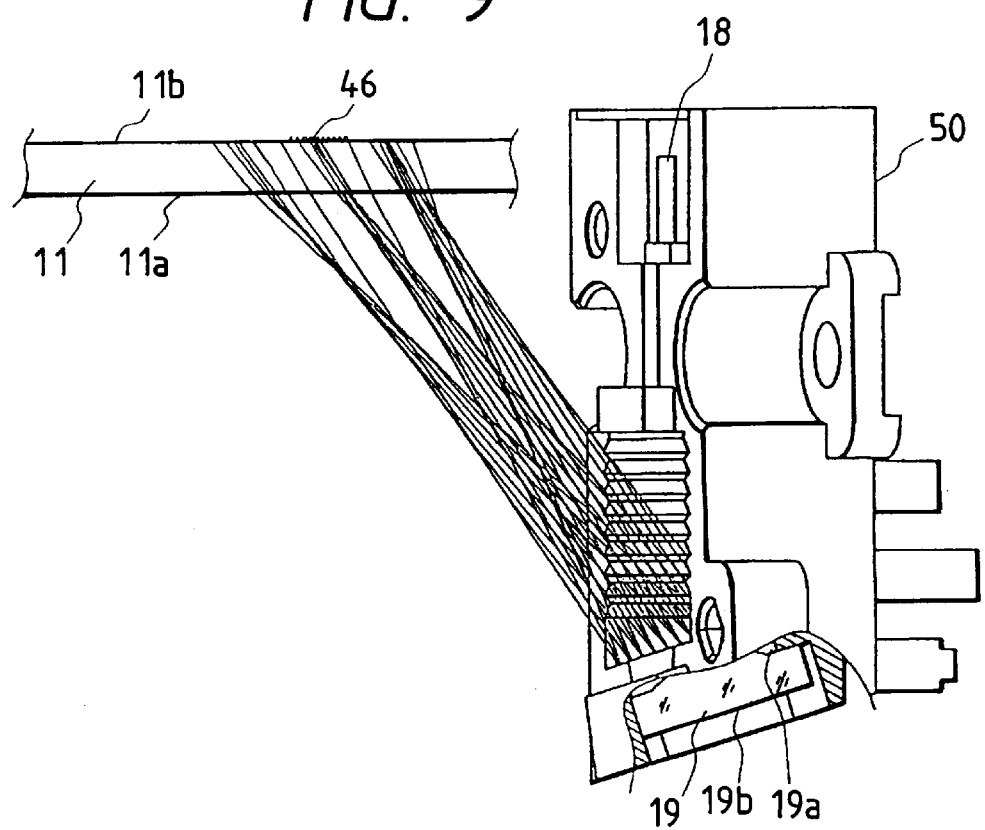
FIG. 9 is a side view of the illuminating unit for illustrating the manner in which light is applied to the focusing screen.

FIG. 9 is a side view of the illuminating unit obtained when a plane passing through the LED 18, the mirror lens 19 and the visual axis input index mark 46 is seen from a direction perpendicular to that plane. This figure depicts rays of light emitted from three representative points on the light emitting surface of the LED 18, and the light beam emitted from the LED and incident from the surface 19a of the mirror lens is reflected by a surface 19b and again passes through the surface 19a toward the focusing screen 11. The illuminated range on the focusing screen is limited by the action of this mirror lens, whereby only the range in which the aforementioned angle formed by and between the tangential line of the Fresnel lens and the irradiating light which is substantially small can be illuminated.

Now, of the light beam emitted from the LED 18, about 4% of the light is reflected when the light beam is incident on the surface 19a of the mirror lens 19 at first. When this reflected light arrives at the focusing screen, ghost light by the scattering on the ridge line of the Fresnel lens may be created depending on the angle formed by it with respect to the tangential line of the Fresnel lens, and may be visually recognized by the finder observer. In the mirror lens used here, the upper surface 19a of the mirror lens is made into a convex surface to thereby cause the reflected light to diverge and the illuminance of the reflected light on the focusing screen is reduced to such a degree that the intensity of the created ghost light cannot be visually recognized.

Figure 10:
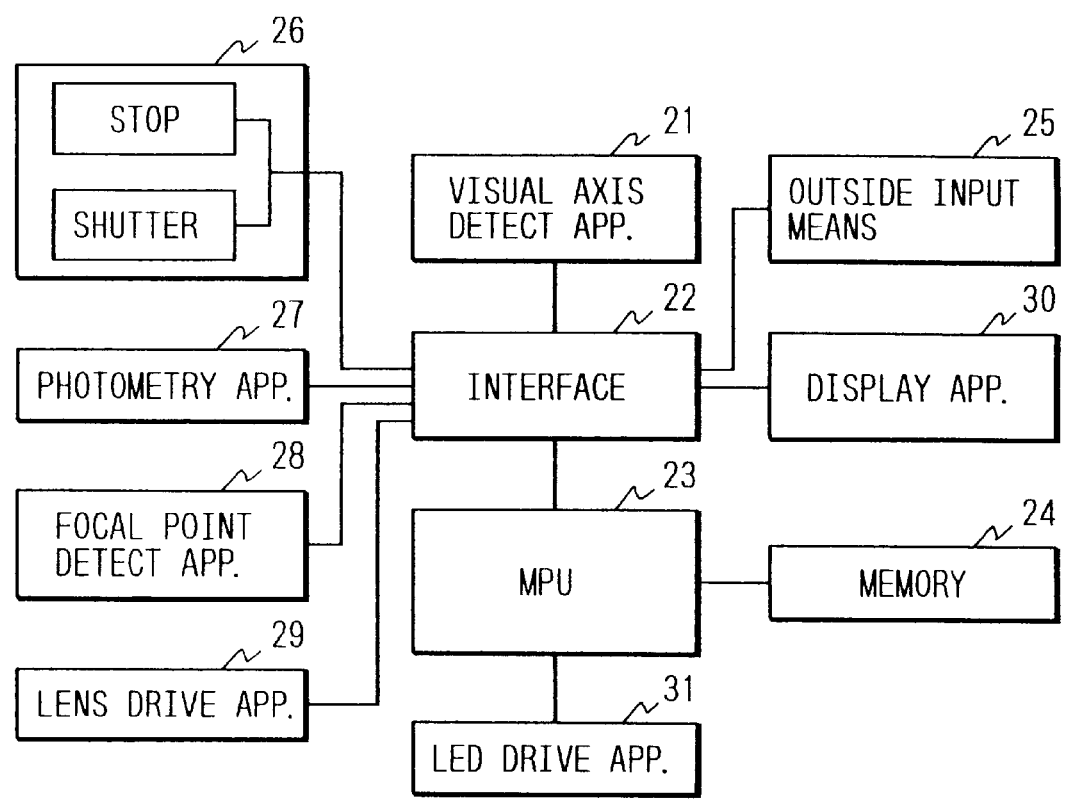
FIG. 10 is a block diagram showing the control system of the camera.

A control system used in the present embodiment will now be described with reference to a block diagram shown in FIG. 10. In FIG. 10, the reference numeral 21 designates a visual axis detecting apparatus including the elements shown in FIG. 3, the reference numeral 22 denotes an interface circuit, the reference numeral 23 designates a microprocessing unit (MPU), the reference numeral 24 denotes a memory, the reference numeral 25 designates outside input means, the reference numeral 26 denotes an exposure control device, the reference numeral 27 designates a photometry apparatus, the reference numeral 28 denotes a focal point detecting apparatus, the reference numeral 29 designates a lens drive apparatus for the control of the photo-taking lens, and the reference numeral 30 denotes a display apparatus such as a display for a monitor, not shown, for effecting the display 2 in the finder and displaying the set state of the camera. The lens drive apparatus and the focal point detecting apparatus together constitute an automatic focus adjusting apparatus. The reference numeral 31 designates an LED drive apparatus including the aforedescribed illuminating unit. The LED drive apparatus effects the color change display of the distance measuring field frame and visual axis input index mark when it is discriminated that the finder observer's visual axis is on the distance measuring field frame or on the visual axis input index mark.

The operation of the camera will now be described with reference to the flow chart of FIG. 11.

Figure 11:
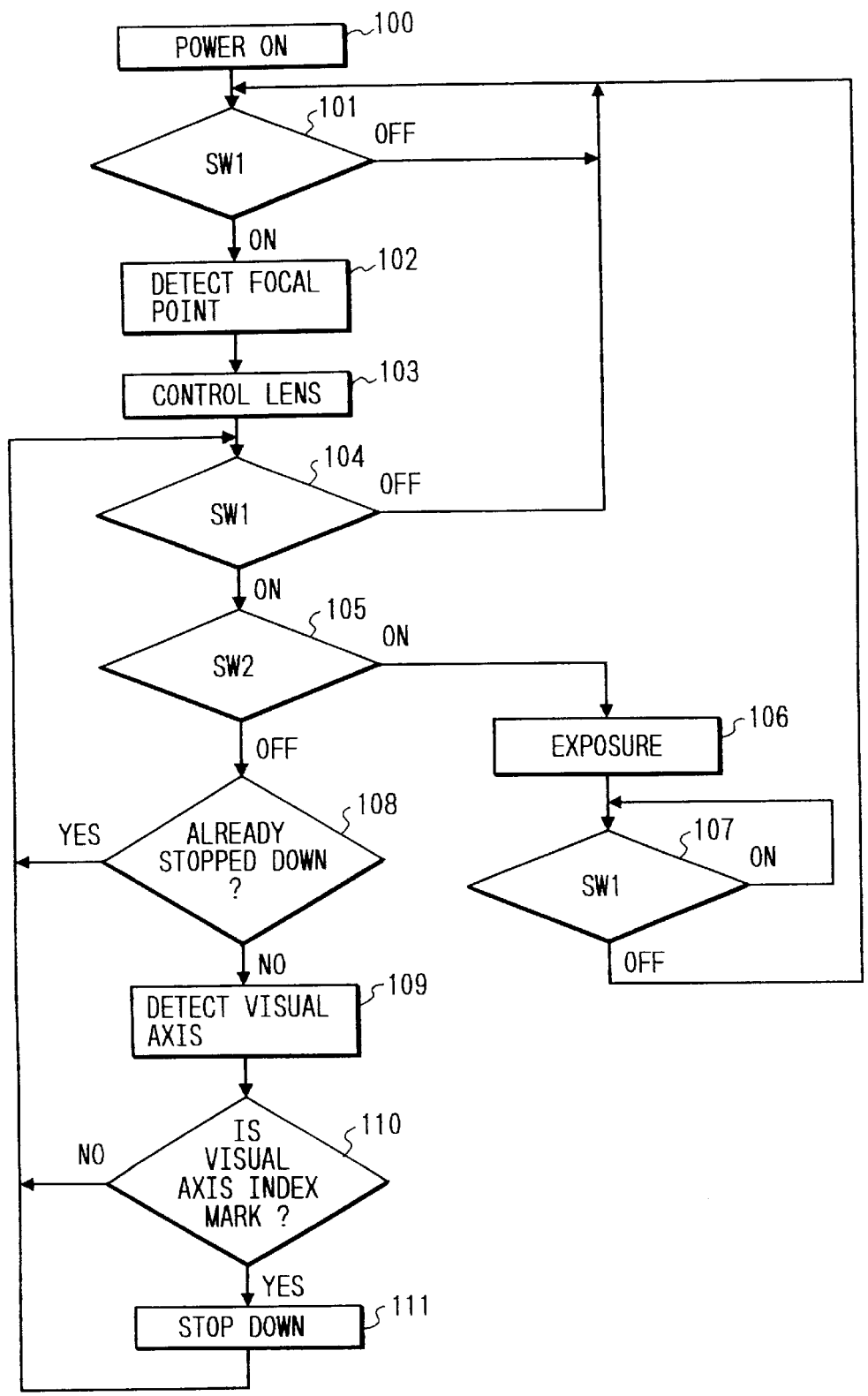
FIG. 11 is a flow chart showing the operation of the camera.

In FIG. 11, at a step 100, the power source switch of the camera is closed, whereafter at a step 101, the state of a switch SW1 adapted to be closed in response to the half depression of a release button is examined, and this detection is repeated until the switch SW1 becomes closed.

When the switch SW1 becomes closed and shift is made to a step 102, where the member 3 effects the detection of the defocus amount of the object image by the focal point detecting apparatus 28.

At a step 103, the in-focus control of the photo-taking lens is effected on the basis of the result of the previous step 102.

When the control of the photo-taking lens is terminated, at a step 104, the state of the switch SW1 is examined and if it is OFF, return is made to the step 101, where the state of the switch SW1 continues to be detected. If the switch SW1 is ON, shift is made to the next step 105, where the state of a switch SW2 adapted to be closed in the depressed state of the release button is examined.

If the switch SW2 is ON, shift is made to a step 106, where a series of film exposing operations such as the retraction of the half mirror 10 and sub-mirror 15, the driving of the stop device 9 and the control of a shutter, not shown, and the resetting of these are performed.

At the next step 107, the state of the switch SW1 is detected because a new focus adjusting operation is prohibited as long as the release button is maintained in its depressed state, and this step is repeated as long as the switch SW1 is ON, and when the OFF state of this switch is detected, shift is made to the step 101.

If at the step 105, the switch SW2 is OFF, shift is made to a step 108, where whether the stop-down operation to be started at a step which will be described later is already performed is examined. If the stop-down operation is already performed at the step 108, return is made to the step 104, where the detection of the state of the switch SW1 is effected again. If the stop-down operation is not yet performed, shift is made to a step 109.

At the step 109, the finder observer's visual axis position is detected by the visual axis detecting apparatus 21. At the next step 110, whether the visual axis position has seen on or near the visual axis input index mark 4 a predetermined number of times or has stayed there for a predetermined time is examined, and if the visual axis position is not near the mark 4, return is made to the step 104, and if the visual axis position is there, shift is made to a step 111.

At the step 111, the visual axis input index mark is illuminated by the illuminating unit to thereby effect color change display and a control signal is formed on the basis of the luminance information of the object obtained by the photometry apparatus 27 and the shutter speed or the aperture value set by the outside input means 25 to thereby drive the stop device 9 which is a constituent of the exposure control apparatus 26, and an object image by a light beam under the same condition as photographing is formed on the focusing screen 11. Accordingly, the depth of field can be confirmed on the finder. When this stop-down operation is terminated, return is made to the step 104, where the detection of the state of the switch SW1 is effected.

In the control described above, the detection of whether the finder observer is seeing the visual axis input index mark has been effected at the step 109 and the step 110, but this is in the state in which focus adjustment is terminated and the depression of the release button is waited for, that is, the loop for waiting the closing of the switch SW2. Accordingly, the finder observer is paying his attention to the object image field 1 in the field of view of the finder shown in FIG. 1 and the display portion 2, and it is often the case that the observer's point of view reciprocally moves between the distance measuring field frame (one of 3a–3e) in which the main object lies and the display portion 2. However, as previously described, the human sight is obtained as a result of image information which is projected onto the retina being collectively processed, and image information obtained a moment before is also added to it. The gaze position by sight and the motion of eyeball are not related with each other completely at one to one. That is, even though the finder observer is seeing the distance measuring field frame and the display portion, the actual motion of the eyeball spreads over a considerably wide range.

So, in the present embodiment, the display portion 2 in the field of view of the finder is first disposed along a side of the object image field 1, and then the visual axis input index mark 4 is set at a location opposed to the information display portion 2 with the distance measuring field frames 3a–3e interposed therebetween, whereby the stop-down operation is started only when the finder observer consciously sees the vicinity of the visual axis input index mark. The stop-down operation is released after a predetermined time elapses.

Figure 12:
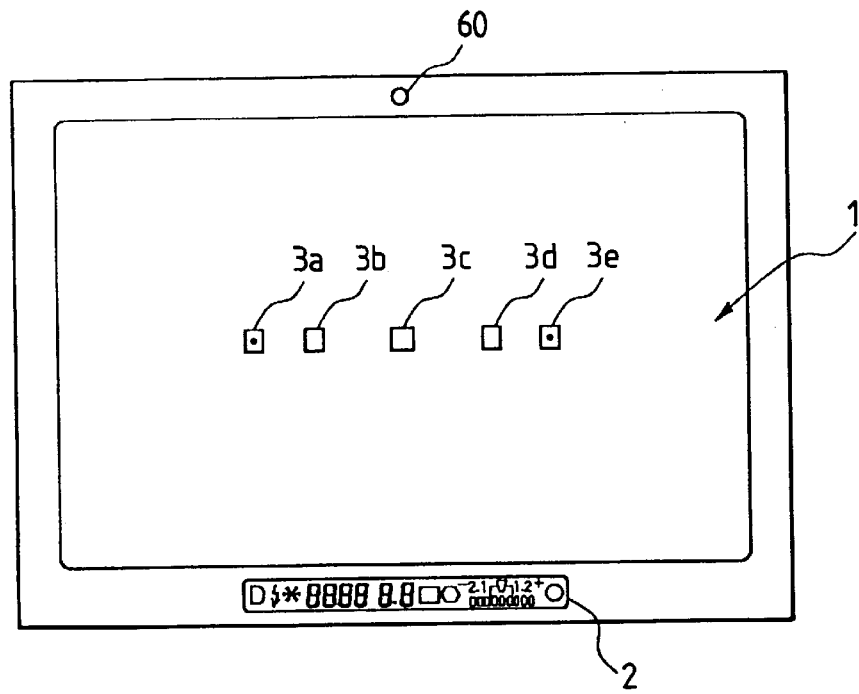
FIG. 12 illustrates the field of view of a finder.
Figure 13:
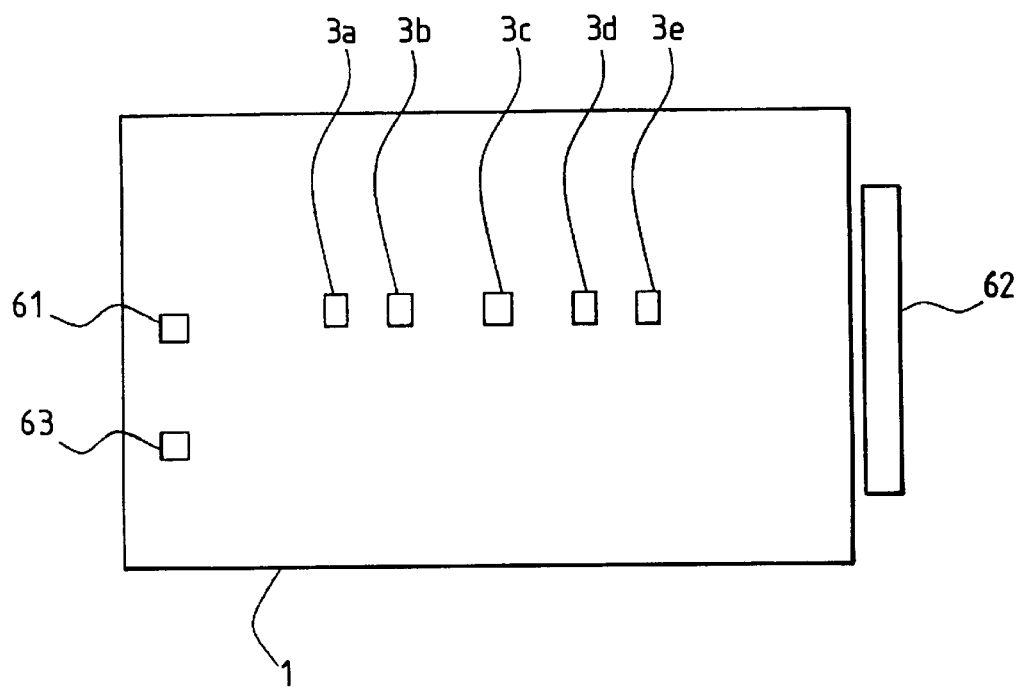
FIG. 13 illustrates the field of view of the finder.

FIGS. 12 and 13 depict further examples of the arrangement of the visual axis input index mark and the photographing condition display portion. In FIG. 12, a visual axis input index mark 60 is disposed at a location opposed to the photographing information display portion with the distance measuring field of the automatic focus adjusting apparatus interposed therebetween and outside the object field 1.

FIG. 13 shows an example in which visual axis input index marks 61 and 63 are disposed at the left of the object field 1 and an information display portion 62 is disposed at the light of the object field 1. Different control functions may be started by the visual axis input index marks 61 and 63, or a control function may be started by the index mark 61 and may be released by the index mark 63. Also, the photographing conditions may be displayed in proximity to the edge of the object field 1.

Figure 14:
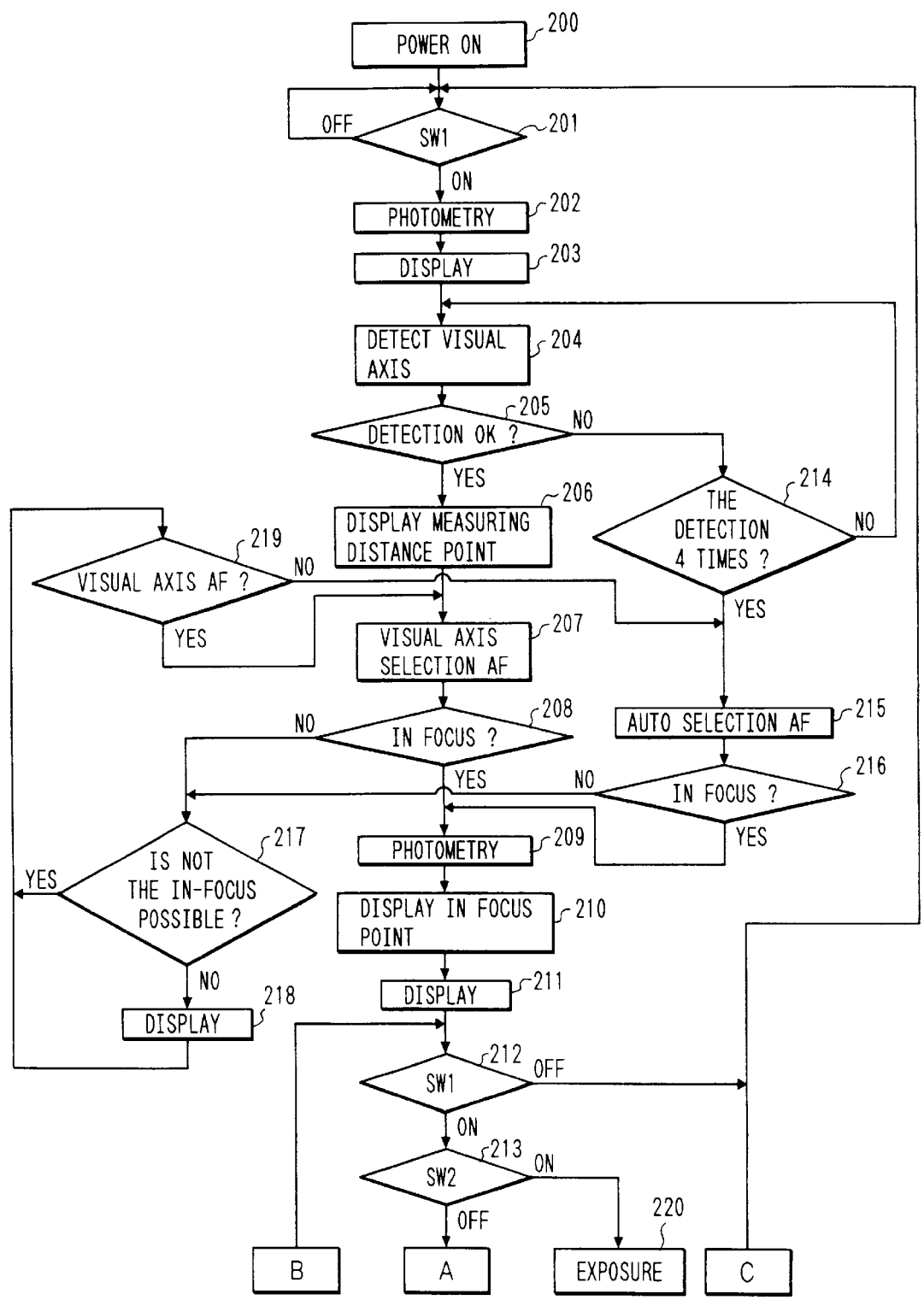
FIG. 14 is a flow chart showing another operation of the camera.

The flow of another operation of the camera will now be described with reference to FIGS. 14 and 15. In FIG. 14, it is first judged that the operating buttons in the camera have been depressed, and the power source switch is closed (step 200), and the state of the switch SW1 adapted to be closed in response to the half-depressed state of the release button is examined (step 201), and the detection of the closing of the switch SW1 is repeated until the timer for closing the power source switch is turned off.

When the switch SW1 becomes closed, the MPU 23 first starts the photometry apparatus 27 through the interface 22 and calculates the object luminance corresponding to each area in the finder (step 202). This calculated value and the shutter speed or the aperture value by the ISO code of film inserted in the camera or the open FNO of the lens or the like are displayed by the LCD 2 in the finder and the display device 30 for a monitor, not shown (step 203).

Subsequently, the finder observer's visual axis position is detected by the visual axis detecting apparatus 21 (step 204). This visual axis detection is the detection of the distance measuring frames 3a–3e corresponding to the distance measuring points disposed in the field of view of the finder. Whether this detection has been successful is judged (step 205), and if it has been successful, which distance measuring point has been selected is displayed to the finder observer by one of the distance measuring frames 3a–3e being illuminated by the LED 20 for superimposition (step 206).

When the display is terminated, visual axis selection AF for effecting the focus detection by the distance measuring point selected by said visual axis detection is executed (step 207). At this step, the detection of the defocus of the object image is effected by the focal point detecting apparatus 28, and the in-focus control of the photo-taking lens is effected on the basis of the value of the detected defocus. Whether the lens is in focus is judged by this in-focus control (step 208), and if the lens is in focus, the in-focus control operation is stopped and the focus position of the lens is locked.

At this locked focus position, the luminance of each area in the finder relative to the object image is photometered by the multi-divided photometry sensor 32 (step 209), and this photometered value is also locked like the focus position.

Subsequently, at the distance measuring point selected by the visual axis, one of the distance measuring frames 45a–45e which corresponds to that distance measuring point is in-focus-point-displayed by the LED 20 for superimposition on the basis of the photometered value at the step (209) (step 210), and the shutter speed and the aperture value are displayed by the LCD 2 in the finder and the display device for the monitor on the basis of the photometered value at the step 209 (step 211), and this shutter speed and this aperture value are also determined, like the in-focus point display (step 210), by weighting the brightness corresponding to the selected distance measuring point. At the next step 212, whether the above-mentioned locked focus position and photometered value should be held as the photographing conditions is discriminated from the state of the switch SW1, and whether the exposing operation should be performed under those conditions is examined from the state of the switch SW2 (step 213).

If here, the switch SW2 is ON, shift is made to an exposure sequence, in which a series of film exposing operations such as the retraction of the half mirror 10 and sub-mirror 15, the driving of the stop device 9 and the control of the shutter, not shown, and the resetting of these are performed (step 220).

In the aforementioned judgment of the visual axis detection of the distance measuring frames (step 205), when the detection is successful, shift has been made to the visual axis selection AF, but if here, the photographer is not seeing the interior of the field of view of the finder or if the photographer wears a pair of spectacles which will out infrared light which is difficult to catch by the visual axis detecting apparatus and the detection is unsuccessful, shift is made to a step 214, where the number of times over which the visual axis could not be detected is judged. The number of times of this detection is four times, and if the judged number of times is less than four times, return is made to the step 204, where the detection of the visual axis is effected again. If for four times the visual axis detection is unsuccessful, there is brought about automatic selection AF (step 215) in which the camera uniquely determines a distance measuring point in conformity with the object image and effects focus adjustment.

Again here, as in the visual axis selection AF (step 207), the defocus of the object image is detected by the focal point detecting apparatus 28 and the in-focus control of the photo-taking lens is effected. Whether the lens is in focus is judged in this in-focus control (step 216), and if the lens is in focus, the in-focus control operation is stopped and the focus position of the lens is locked, and shift is made to a step 209. If the lens is not yet in its in-focus condition, whether the lens cannot completely be in focus is checked up at a step 217, and if it is judged that the lens cannot be in focus, that effect is displayed by the LCD 2 in the finder (step 218). Also, this discrimination of the impossible state (step 217) is likewise entered from the in-focus judgment of the visual axis AF (step 208). This is a display routine in which the photographer is informed that the lens cannot be focused on the object being distance-measured. When the number of times of distance measurement is still small and in-focus is not impossible or when the impossibility of in-focus is displayed, whether the visual axis selection AF or the automatic selection AF is going on is judged (step 219), and if the visual axis selection AF is going on, shift is made to a step 207, and if the automatic selection AF is going on, shift is made to a step 215, where this operation is repeated.

Figure 15:
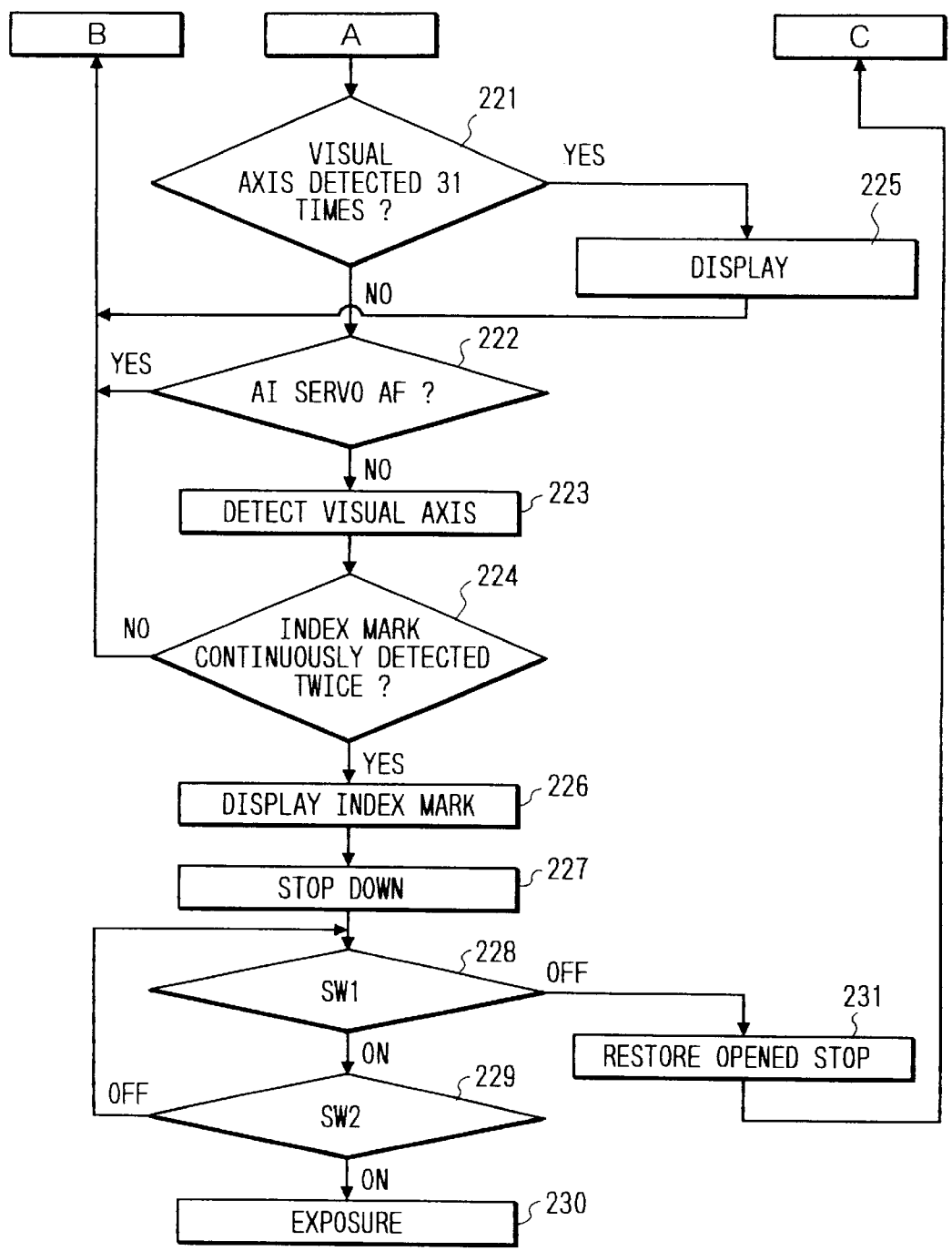
FIG. 15 is a continuation of the flow chart of FIG. 14.

If the state of the switch SW2 at the step 213 is OFF, a shift is made to the flow of FIG. 15, and a routine for executing the stop-down by visual axis detection is entered. The number of times of the visual axis detection which now-begins is judged (step 221), and if the number of times is 30 or less, whether there is going on the so-called conventional AI servo AF in which distance measurement is repeated while the object is pursued after is judged (step 222). This is for prohibiting the lens from being stopped down during the pursuit of the object to thereby make distance measurement impossible.

If the AI servo AF is not going on, the visual axis detection of the visual axis input index mark in the field of view of the finder is now effected (step 223).

In this visual axis detection, whether the index mark portion has been detected twice on end is judged (step 224), and if not so, detection is effected up to 30 times in accordance with the judgment of the step 221.

If the index mark portion is detected twice on end, the visual axis input index mark 4 is superimpose-displayed by the LED 18 to inform the photographer to that effect (step 226). This display is also effected correspondingly to the luminance of the visual axis input index mark portion obtained by the photometry apparatus 27 at the step 209.

When the display is completed, the stop device 9 which is a constituent of the exposure control apparatus 26 is driven on the basis of the shutter speed or the aperture value set by the outside input means 25, or on the basis of the photometered value obtained and locked at the step 209 (step 127), and an object image by a light beam under the same condition as photographing is formed on the focusing screen. Accordingly, the depth of field can be confirmed on the finder.

When this stop-down operation is terminated, the state of the switch SW1 is detected (step 228), and if this switch is in its ON state, the switch SW2 becoming ON is waited for (step 229), and when the switch SW2 becomes ON, shift is made to an exposure sequence similar to the step 220. When the switch SW1 becomes OFF before the switch SW2 becomes ON, the stopped-down aperture is restored to the opened stop (step 231), and shift is made to the step 201, where the state of the switch SW1 is detected.

When in the aforedescribed judgment of the number of times of visual axis detection (step 221), the 31st time is reached, display is effected by the LCD display 2 in the finder which informs the photographer of the termination of the visual axis detection (step 225), and return is made to the detection of the state of the switch SW1 (step 212). Also, when the AI servo AF is going on at the step 222, return is likewise made to the step 212.

The relation between the display in the field of view of the finder and the photometry sensor will now be described with reference to FIGS. 1 and 16.

Figure 16:
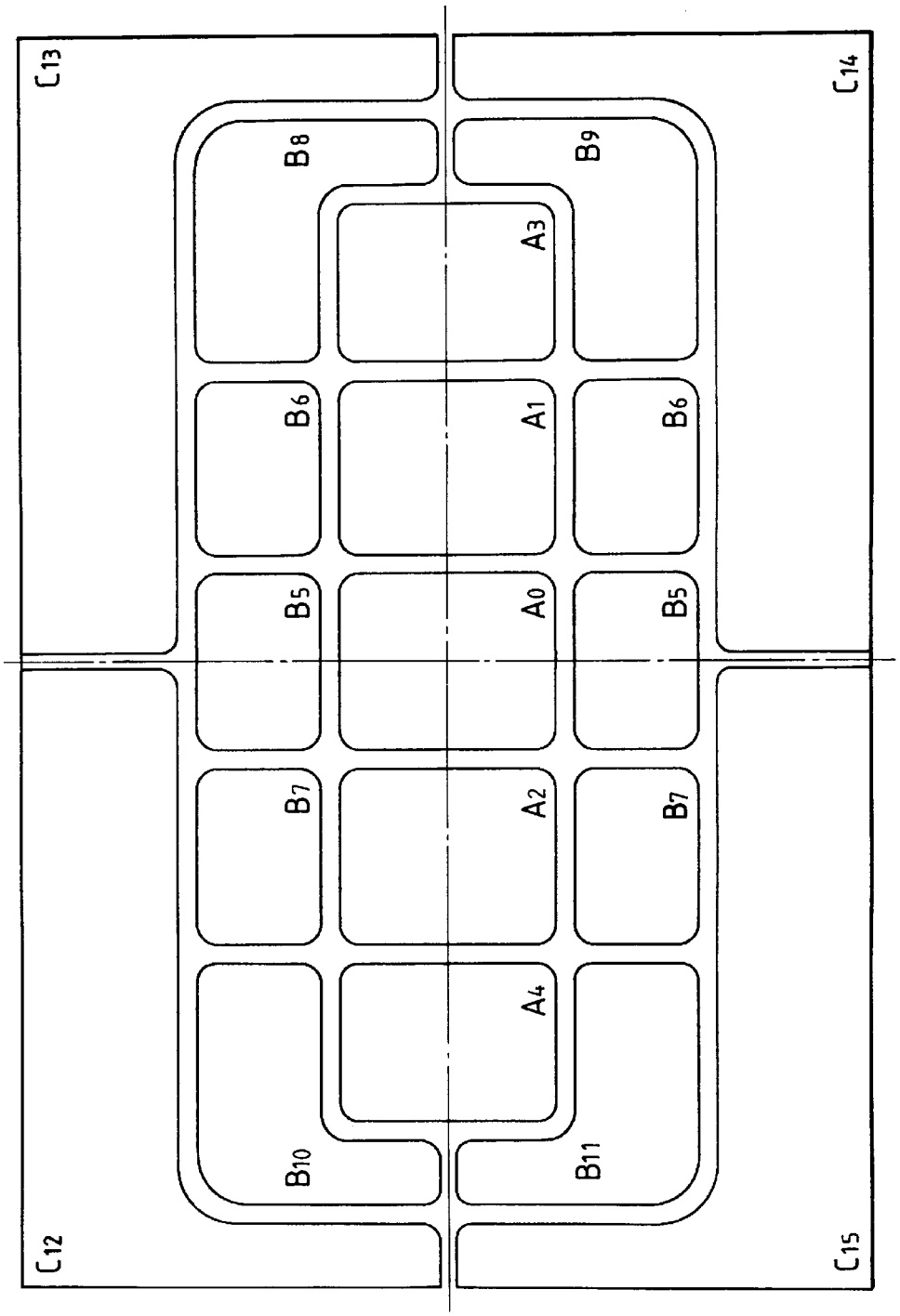
FIG. 16 shows the layout of the light sensing portions of a photometry sensor.

FIG. 16 shows the layout of the light sensing portion of the photometry sensor for photometering the luminance of sixteen areas into which the area in the field of view of the finder is divided, and the correspondence thereof to the field of view of the finder is optically reversed at right and left like the focusing screen 11 of FIG. 4. The distance measuring field frames 3a–3e disposed on the focusing screen correspond to A0–A4, on the layout of the photometry sensor. That is, 3a corresponds to A3, 3b corresponds to A1, 3c corresponds to A0, 3d correspond to A2, and 3e correspond to A4. Also, the visual axis input index mark 4 corresponds to a portion C13 on the layout of the photometry sensor.

Therefore, when the distance measuring point display (206) by visual axis detection, the in-focus display (210) by the distance measuring point and the superimpose-display of the visual axis input index mark shifting to the stop-down operation are effected, illumination is effected by the use of the corresponding luminance information of the photometry sensor and thus, luminance display conforming to the luminance of each display frame can be effected.

Actually, the luminance of each display frame is subjected to correction determined by the diffusion characteristic of the focusing screen, and the correction is effected by the open FNO (AVO) of the mounted lens.

FIG. 19 shows the diffusion characteristic correction value (FSC) of the focusing screen 11 to the open FNO (AVO) of the mounted lens, and represents that correction is effected at the value of AVO of F3.5 or greater, and if for example, the open FNO of the lens is F4.0, correction is applied by $-\frac{2}{8}$ step from each photometry sensor output.

Therefore, the luminance information of each display frame is calculated as apparent brightness (BFS) on the focusing screen, and to the display frame 3a, BFS3a=A3+FSC,
to the display frame 3b, BFS3b=A1+FSC,
to the display frame 3c, BFS3c=A0+FSC,
to the display frame 3d, BFS3d=A2+FSC,
to the display frame 3e, BFS3e=A4+FSC,
and to the index mark 4, BFS4=C13+FSC, and on the basis of the apparent brightness (BFS) on the focusing screen 11, the luminance of the LED for superimpose display is varied in conformity with the luminance of the object image.

Figure 17:
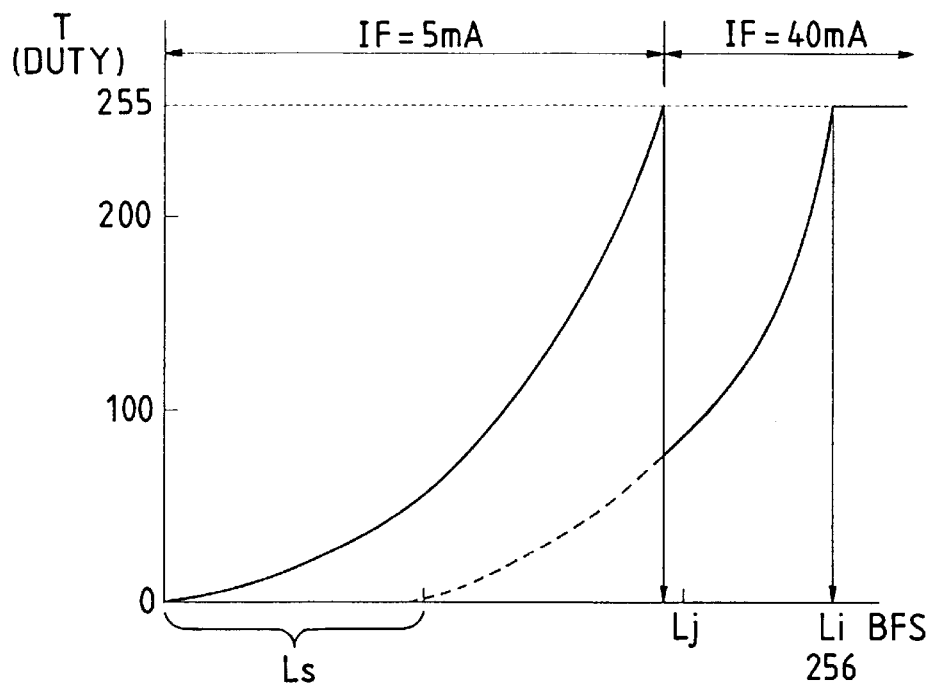
FIG. 17 illustrates a method of driving an LED for displaying a distance measuring point.

FIG. 17 illustrates a driving system for the LED 20 for displaying the distance measuring field frame in the field of view of the finder, and luminance modulation is applied at a duty ratio based on two stages of current control and the value of BFS. At the predetermined values of LED current IF, i.e., IF=5 mA and IF=40 mA, display is effected at a duty ratio of T/256.

Li is the value of BFS which is the maximum luminance of LED determined for each LED, and Lj is a value determined by the luminance characteristic of LED and an optical condition under which the light of LED is directed to the display frame in the field of view of the finder, and at this location, the switching of the current IF is effected.

Also, the maximum luminance portion of LED which is Li is defined as 256, and the duty ratio of T/256 is determined by the value of BFS found from the luminance of each distance measuring field frame and is displayed at a certain determined driving frequency. These two stages of current switching take the value of BFS, the LED characteristic and the characteristic of the optical device for illuminating the LED into account, and are for enabling the photographer to confirm even in the entire photometry luminance range of the camera. This means that the switching is made to correspond to a point at which the value of BFS in Ls shown in FIG. 17 becomes small.

Figure 18:
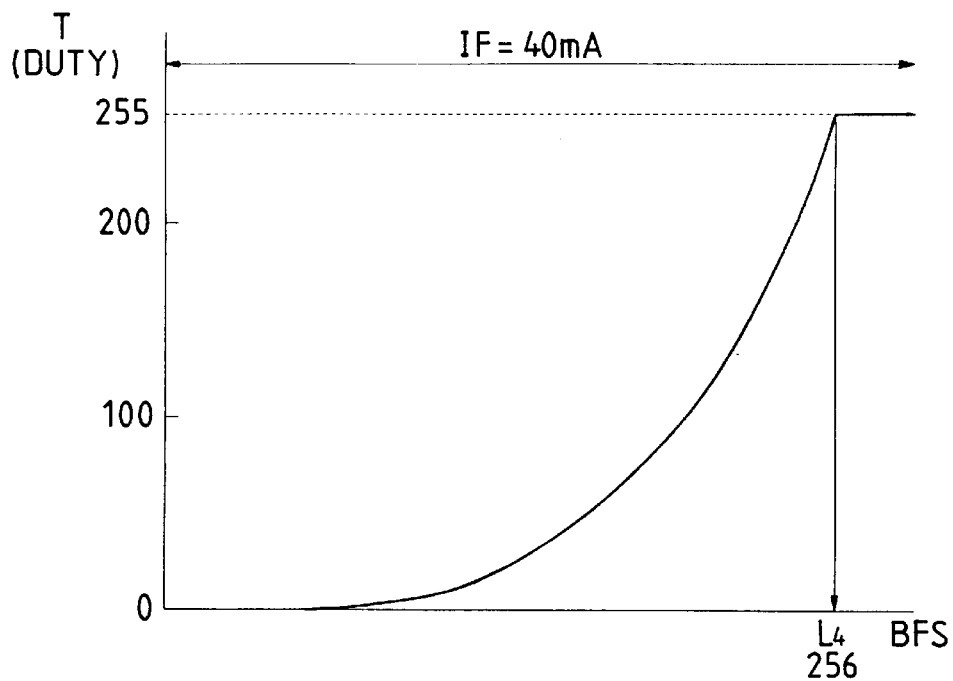
FIG. 18 illustrates a method of driving an LED for displaying the visual axis input index mark.

A driving system for the LED 18 for displaying the visual axis input index mark 4 is shown in FIG. 18. It is for simplifying the control that in this figure, the LED current is fixed at IF=40 mA and the line for varying the duty is single, because it is considered that when the object image in the field of view of the finder is sufficiently dark (the value of BFS is small), the stop-down operation by visual axis input is very rarely used, and the basic concept of driving shown in FIG. 18 is similar to the distance measuring point display shown in FIG. 17.

In FIG. 13, the division of the photometry sensor may be changed so as to correspond to the visual axis input index marks 61 and 63 and display means for each index mark may be provided, whereby index mark display corresponding to the luminance of the object may be effected when the control function is started. In a camera having the visual axis input detection according to the present embodiment, the selection of the distance measuring points is the first visual axis detection and the selection of stop-down is the second visual axis detection, but where the control function is provided, for example, by means for changing over the shutter speed and aperture value or the mode of the camera, the control function may be started prior to the detection of the distance measuring points. Also, when in such case, the correction of exposure is preset, it is desirable to prohibit the visual axis detection by the visual axis input index mark meter. Further, as regards the number of times of visual axis detection and judgment, judgment has been done at the step 204 as to whether the visual axis could be detected at least once out of four times, and judgment has been done at the step 224 as to whether the visual axis could be detected twice on end, but as previously described, this number of times may be set depending on the difference in the control function, and this number of times may be determined such that whether the visual axis has stopped for a predetermined time is judged. Likewise, the number of times of visual axis detection has been four times at the step 214 and 30 times at the step 221, but it may be changed depending on the difference in battery capacity or control function, or the detection may be stopped in a predetermined time.

Design is made such that the stop-down operation is released by the opening of the switch SW1 at the step 128, but alternatively, a certain time may be set and the stop-down operation may be released after the lapse of that time, and this also holds true when other control function is performed.

The above embodiment has been described as being applied to a single-lens reflex camera, but the present invention may also be applied to a lens shutter camera in which a finder is provided discretely from a photo-taking lens and which is provided with a non-TTL range finder type AF distance measuring apparatus, a video camera of the television AF type or a monitoring apparatus.

As described above, according to the present invention, a visual axis detection index mark is optically disposed in the field of view of the finder for each function performed during the detection of the index mark, whereby there is obtained the effect that the photographer observing the field of view of the finder can easily and reliably cause each function to be performed. Also, it also leads to a similar effect to provide a visual axis detection and judgment standard correspondingly to each visual axis detection index mark.

Where the detection of the visual axis cannot be effected a designated number of times or within a predetermined time, visual axis detection stopping means is provided to thereby prevent a reduction in battery capacity and reduce the fatigue of the photographer's eye as much as possible. Further, a state in which visual axis detection is impossible is not continued and cumbersomeness during photographing is eliminated.

By the provision of a visual axis detection index mark disposed in the field of view of the finder, a photometry sensor multi-dividing the area in the field of view of the finder and corresponding to the position of the index mark, and display means for displaying each index mark portion, whether the photographer's visual axis has been detected at an intended location and whether each operation is controlled can be known during photographing.

What is claimed is:

1. An optical apparatus comprising:

finder means for observing an object therethrough;

visual axis detecting means for detecting a visual axis position of an observer observing the object through said finder means;

means for determining a distance measuring field on the basis of an output of said visual axis detecting means and forming a focus adjusting signal with respect to said distance measuring field, said distance measuring field determining means selecting a distance measuring field based on a number of detections of the visual axis position by said visual axis detecting means;

a display portion for displaying a control function of said optical apparatus in a field of view of said finder means; and a visual axis input index mark disposed within a scene observation field of said finder means, wherein said visual axis detecting means forms a signal for performing a desired function when it detects that the visual axis position of the observer is on or near said visual axis input index mark, said visual axis detecting means detecting that the visual axis position of the observer is on or near said visual axis index mark based on a number of detections of the visual axis position by said visual axis detecting means, the number of detections for detecting that the visual axis position of the observer is on or near said visual axis input index mark being different from the number of detections for selecting a distance measuring field, and wherein said display portion is set along a side of the field of view of said finder means, and said visual axis input index mark is disposed at a side of said distance measuring field that is opposite the side of said distance measuring field at which said display portion is disposed.

2. An optical apparatus according to claim 1 wherein said optical apparatus includes a single-lens reflex camera.

3. An optical apparatus comprising:

finder means for observing an object therethrough;

visual axis detecting means for detecting a visual axis position of an observer observing the object through said finder means;

means for determining a distance measuring field frame by said visual axis detecting means, said distance measuring field determining means selecting a distance measuring field based on a number of detections of the visual axis position by said visual axis detecting means;

a visual axis input index mark disposed within a scene observation field of said finder means, discrete from the distance measuring field frame, and cooperable with said visual axis detecting means to cause a desired function to be performed when said visual axis detecting means detects that the visual axis position of the observer lies on or near said visual axis input index mark, said visual axis detecting means detecting that the visual axis position of the observer lies on or near said visual axis input index mark based on a number of detections of the visual axis position by said visual axis detecting means, the number of detections for detecting that the visual axis position of the observer lies on or near said visual axis input index mark being different from the number of detections for selecting a distance measuring field; and control means for controlling said visual axis detecting means to prevent subsequent detection operations after a predetermined number of detection operations, wherein the number of detections for selecting the distance measuring field frame is determined.

4. An optical apparatus comprising:

finder means for observing an object therethrough;

visual axis detecting means for detecting a visual axis position of an observer observing the object through said finder means;

distance measuring field frames corresponding to distance measuring fields in a field of view of said finder means, a distance measuring field frame being selected by a number of detection operations by said visual axis detecting means;

a visual axis input index mark portion, a visual axis input index mark of said visual axis input index portion being selected by a number of detection operations by said visual axis detecting means, the number of detection operations for selecting a visual axis input index mark being different from the number of detection operations for selecting a distance measuring field frame;

display means provided in each of said distance measuring field frames and said visual axis input index mark portion for displaying a selection based on a detected visual axis position of said visual axis detecting means; and multi-division photometry means for multi-dividing an effective area in the field of view of said finder means, the effective area corresponding to each of said measuring field frames, and photometering the luminance of divided areas of said multi-division photometry means, wherein at least one of said distance measuring field frames and said visual axis input index mark portion is selected by said visual axis detecting means, and wherein said display means is driven in accordance with photometered luminance information corresponding to the respective divided area.

5. An optical apparatus comprising:

finder means for observing an object therethrough;

visual axis detecting means for detecting a visual axis position of an observer observing the object through said finder means, said visual axis position corresponding to a visual selection by the observer;

distance measuring field frames corresponding to distance measuring fields in a field of view of said finder means, a distance measuring field frame being selected by a number of detection operations by said visual axis detecting means;

a visual axis input index mark portion disposed within a scene observation field of said finder means, a visual axis input index mark of said visual axis input index portion being selected by a number of detection operations by said visual axis detecting means, the number of detection operations for selecting a visual axis input index mark being different from the number of detection operations for selecting a distance measuring field frame;

multi-division photometry means for respectively photometering the visual axis input index mark and the area corresponding to the distance measuring field frame; and variable-drive display means provided in each of said distance measuring field frames and said visual axis input index mark portion for displaying a visual selection detected by said visual axis detecting means, wherein a driving operation of said variable-drive display means varies in accordance with a photometry output of the area detected by said visual axis detecting means.

6. An optical apparatus comprising:

finder means for observing an object therethrough;

visual axis detecting means for detecting a visual axis position of an observer observing the object through said finder means;

means for determining a distance measuring field frame by detecting a visual axis position with said visual axis detecting means, the distance measuring field frame being determined by a number of detection operations by said visual axis detecting means;

a visual axis input index mark, discrete from the distance measuring field frame, for visually designating a desired function to be performed when said visual axis detecting means detects that the visual axis position of the observer lies on or near said visual axis input index mark, the visual axis input index mark being determined by a number of detection operations by said visual axis detecting means, the number of detection operations for determining the visual axis input index mark being different from the number of detection operations for determining the distance measuring field frame; and control means for controlling said visual axis detecting means, wherein said control means controls said visual axis detecting means so as to perform detection of whether the visual axis position of the observer lies on or near the visual axis input index mark, after said visual axis detecting means determines the distance measuring field frame and focusing is performed.

* * * * *

UNITED STATES PATENT AND TRADEMARK OFFICE
CERTIFICATE OF CORRECTION

PATENT NO. : 5,970,258

DATED : October 19, 1999

INVENTOR(S): YASUO SUDA, ET AL.

Page 1 of 3

It is certified that error appears in the above-identified patent and that said Letters Patent is hereby corrected as shown below:

<u>At [56] FOREIGN PATENT DOCUMENTS</u>

"387818" should read --3-87818--.
"3109029" should read --3-109029--.

<u>Column 2</u>

Line 20, "becomes" should read --become--.
Line 38, "mean," should read --means,--.

<u>Column 5</u>

Line 21, "respectively". Should read --respectively).--.

UNITED STATES PATENT AND TRADEMARK OFFICE
CERTIFICATE OF CORRECTION

PATENT NO. : 5,970,258

DATED : October 19, 1999

INVENTOR(S): YASUO SUDA, ET AL.

It is certified that error appears in the above-identified patent and that said Letters Patent is hereby corrected as shown below:

Column 6

Line 50, "superimpose" should read --superimposed--.
    Line 58, "59" should read --51--.

Column 8

Line 63, "his" should be deleted.

Column 11

Line 15, "now-begins" should read --now begins--.

UNITED STATES PATENT AND TRADEMARK OFFICE
CERTIFICATE OF CORRECTION

PATENT NO. : 5,970,258
DATED     : October 19, 1999
INVENTOR(S): YASUO SUDA, ET AL.

It is certified that error appears in the above-identified patent and that said Letters Patent is hereby corrected as shown below:

Column 12

Line 7, "correspond" (both occurrences) should read --corresponds--.
    Line 38, "superimpose" should read --superimposed--.

Column 13

Line 41, "other" should read --another--.

Column 14

Line 46, "claim 1" should read --claim 1,--.

Signed and Sealed this

Third Day of April, 2001

Attest:

NICHOLAS P. GODICI

Attesting Officer    Acting Director of the United States Patent and Trademark Office